(12) United States Patent
Hoffman et al.

(10) Patent No.: US 6,984,069 B2
(45) Date of Patent: Jan. 10, 2006

(54) HYDRODYNAMIC THRUST BEARING

(75) Inventors: Joerg Hoffman, Mettlach (DE); Olaf Winterhalter, Epfendorf (DE)

(73) Assignee: Mineabea Co., Ltd., Nagano (JP)

( * ) Notice: Subject to any disclaimer, the term of this patent is extended or adjusted under 35 U.S.C. 154(b) by 269 days.

(21) Appl. No.: 10/620,646

(22) Filed: Jul. 16, 2003

(65) Prior Publication Data

US 2004/0081377 A1 Apr. 29, 2004

(30) Foreign Application Priority Data

Jul. 22, 2002 (DE) ..................................... 202 11 064 U

(51) Int. Cl.
*F16C 32/06* (2006.01)

(52) U.S. Cl. ..................................... 384/107
(58) Field of Classification Search ................. 384/100, 384/107–114, 121
See application file for complete search history.

(56) References Cited

U.S. PATENT DOCUMENTS

| 4,082,293 | A | * | 4/1978 | Schouwenaars | ............. | 369/269 |
| 5,357,163 | A | | 10/1994 | Minakuchi et al. | | |
| 6,357,916 | B2 | * | 3/2002 | Saeki et al. | ................. | 384/100 |
| 6,361,216 | B1 | * | 3/2002 | Takahashi et al. | .......... | 384/123 |
| 6,398,413 | B1 | * | 6/2002 | Inoue et al. | ................. | 384/112 |
| 2004/0114840 | A1 | * | 6/2004 | Gomyo | ....................... | 384/107 |

FOREIGN PATENT DOCUMENTS

| DE | 26 36 649 | 3/1977 |
| DE | 196 37 014 | 3/1998 |
| DE | 196 37 015 | 3/1998 |
| EP | 1 251 626 | 10/2002 |
| GB | 274954 | 7/1927 |
| GB | 1 337 621 | 11/1973 |
| JP | 2000310220 | 11/2000 |
| JP | 2000324753 | 11/2000 |
| JP | 2001132738 | 5/2001 |

OTHER PUBLICATIONS

Search Report, Germany, Apr. 11, 2003.

* cited by examiner

*Primary Examiner*—Thomas R. Hannon
(74) *Attorney, Agent, or Firm*—Joel Lutzker, Esq.; Anna Vishev, Esq.; Schulte Roth & Zabel LLP

(57) ABSTRACT

A hydrodynamic thrust bearing forming a part of a bearing system for a rotary bearing of spindle motors utilized to power hard disk drives. The thrust bearing includes at least one annular thrust plate and a counter bearing corresponding to the thrust plate. The thrust plate is firmly connected to a shaft rotatably supported by a radial bearing system. The shaft features an axial bore in the area of the thrust bearing, into which a fixing element is inserted. The fixing element is at least partially provided with a spherical surface. The element is inserted in such a way that the surface of the sphere projects slightly from the end of the shaft and rests on the counter bearing, at least when the motor is at a standstill. Therefore, when the motor is standing still or particularly during its start-up or shut-down phase, the spherical element (and not the bearing surface of the thrust plate) rests on the bearing surface of the cover plate. In this way, the wear and tear to the bearing surfaces and the moment of friction during start-up or shut-down of the motor are greatly reduced.

7 Claims, 1 Drawing Sheet

HYDRODYNAMIC THRUST BEARING

CROSS REFERENCE TO RELATED APPLICATION

This application claims all rights of priority to German Patent Application No. DE 202 11 064.8, filed on Jul. 22, 2002 (pending).

FIELD OF THE INVENTION

The invention relates to a hydrodynamic thrust bearing, particularly forming a part of a hydrodynamic bearing system for a rotary bearing of spindle motors utilized to power hard disk drives.

BACKGROUND OF THE INVENTION

A hydrodynamic bearing system essentially includes a bearing sleeve, a shaft accommodated in cylindrical inner bore of the bearing sleeve and at least one radial bearing section provided between the bearing sleeve and the shaft with the aid of which the shaft and the bearing sleeve are supported rotatably with respect to each other. A bearing gap formed between the shaft and the bearing sleeve is filled with a liquid lubricant, preferably bearing oil.

A hydrodynamic bearing system is also provided with a hydrodynamic thrust bearing to take on axial loads. Such thrust bearing is essentially formed by a thrust plate preferably arranged at one end of the shaft and a corresponding cover plate. The cover plate forms the counter bearing to the thrust plate and seals the entire bearing system from below so that no lubricant can escape from the bearing system.

As the motor starts up, the hydrodynamic pressure first builds up in the bearing system and then reaches its desired setpoint when the motor attaines its critical speed. Conversely, the hydrodynamic pressure in the bearing system reduces as the motor shuts down from its setpoint to zero when the motor comes to a standstill. During the transition phase described above, the hydrodynamic bearing system, and particularly the thrust bearing, does not perform its intended function which is due in part to the bearing surface of the thrust plate touching the bearing surface of the corresponding counter bearing. This results in increased wearing of these bearing surfaces and decreases the lifespan of the motor when there are frequent start-up/shut-down phases.

SUMMARY OF THE INVENTION

The object of the invention is thus to submit a hydrodynamic thrust bearing which is subject to lower wearing particularly during the start-up/shut-down phases of the motor.

The invention is distinguished by the fact that the shaft features an axial bore in the area of the thrust bearing into which a fixing element is inserted. The fixing element is at least partially provided with a spherical surface. It is inserted into the axial bore in such a way that the surface of the sphere projects slightly beyond an end of the shaft and, at least when the spindle motor is at a standstill, rests on the counter bearing.

This means that when the motor is at a standstill or particularly during its start-up or shut-down phase, the spherical element, and not the bearing surface of the thrust plate, rests on the bearing surface of the cover plate. In the provided structure, not only is wear and tear to the bearing surfaces greatly reduced, but also the moment of friction during start-up and shut-down of the motor. However, once the motor has picked up sufficient speed and corresponding hydrodynamic pressure has been built up in the bearing system, the motor runs almost without any friction at all, and the bearing function of the spherical element is no longer required.

The fixing element inserted into the axial bore of the shaft is preferably spherical in shape and is made, for example, of steel, ceramic or brass. It can, however, be essentially cylindrical in shape and only have a spherical surface at the end facing the counter bearing.

The sphere preferably projects from the end of the shaft by a defined distance s, wherein the distance s is chosen in such a way that when the motor has reached its critical speed, the sphere lifts away from the counter bearing and no longer touches it.

Moreover, the sphere is also used as a fixing element to mount the thrust plate to the shaft. Pressing the fixing element into the axial bore of the shaft causes the shaft to expand in the area of the thrust plate creating a radial pressure fixing the thrust plate to the shaft. The press-out force between the shaft and the thrust plate made possible by this type of press connection is at least as great or greater than the press-out force achieved through a conventional press connection. Therefore, even when a very thin thrust plate is used, a high press-out force and good perpendicularity of the thrust plate with respect to the shaft is achieved.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
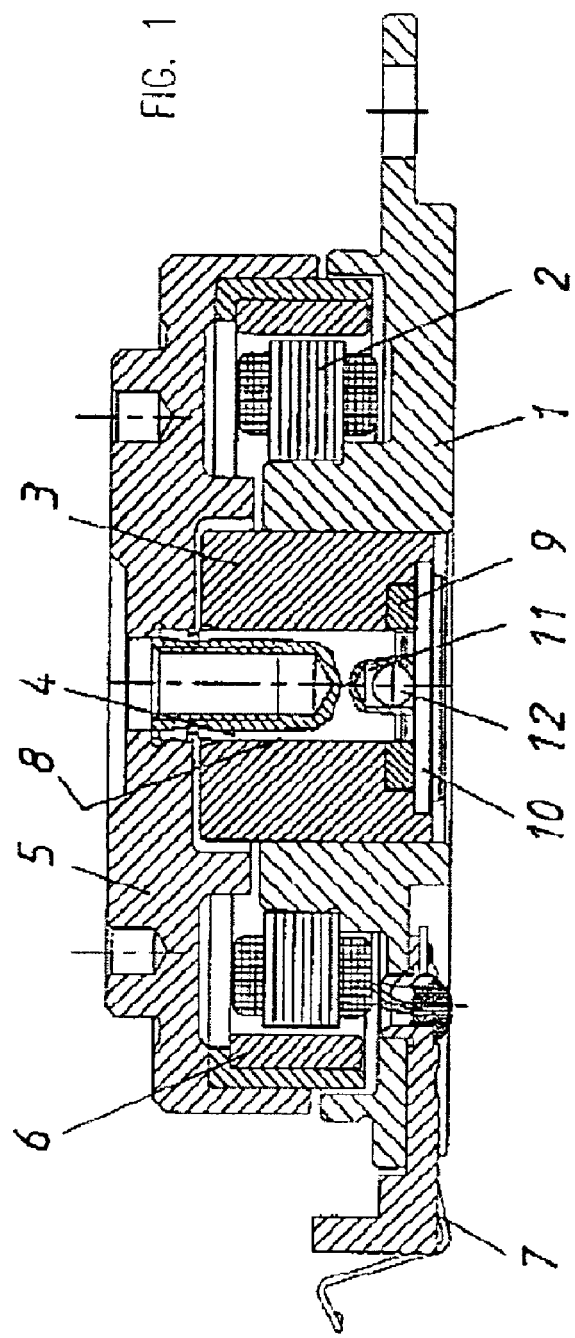
FIG. 1 shows a cross-sectional view of a spindle motor to power a hard disk drive incorporating a first embodiment of the thrust plate according to the invention.
Figure 1A:
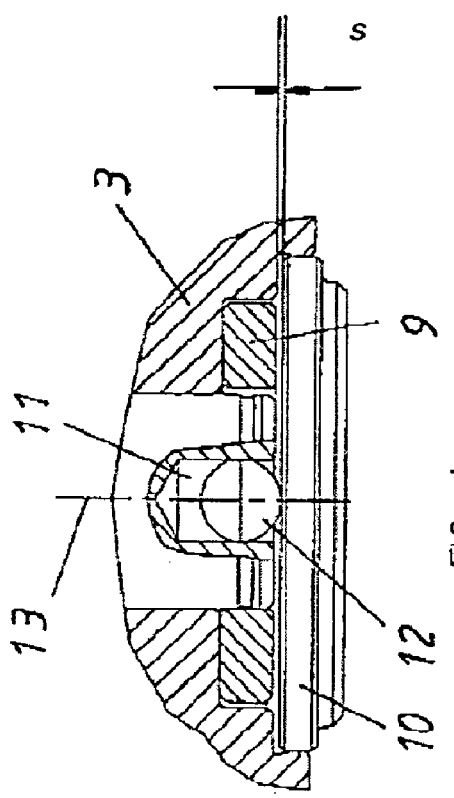
FIG. 1a is an enlarged view of the thrust bearing shown in FIG. 1.

The embodiment of the invention shown in FIGS. 1 and 1a, provides a spindle motor to power a hard disk drive having a hydrodynamic bearing system. In the embodiment illustrated, a shaft carrying a rotor is rotatably supported in a stationary bearing sleeve. As would be understood by a person skilled in the art, the invention also includes designs in which a stationary shaft is enclosed by a rotatable bearing sleeve supporting the rotor.

As shown in FIG. 1, the spindle motor includes stationary baseplate 1 on which stator arrangement 2, consisting of a stator stack and windings, is accommodated. Bearing sleeve 3 is firmly set in a recess in baseplate 1 and features a cylindrical axial bore in which shaft 4 is rotatably accommodated. The free end of shaft 4 supports hub 5 on which one or more storage disks (not illustrated) of the hard disk drive may be arranged and mounted. Located at the inner, lower edge of hub 5 is annular permanent magnet 6 having a plurality of pole pairs which are affected by an alternating electrical field generated by stator arrangement 2 separated from the poles by an air gap, so that rotor 5 is set in rotation together with shaft 4. Power is supplied to the stator windings by using, for example, electric contacts 7.

Bearing gap 8 is formed between an inner diameter of bearing sleeve 3 and an outer diameter of shaft 4. The bearing gap is filled with a lubricant. The hydrodynamic bearing arrangement is formed by two radial bearing sections illustrated schematically by a groove pattern which is provided on the surface of shaft 4 and/or on the inner surface of bearing sleeve 3. As soon as the rotor 5, and thus the shaft 4, is set in rotation, hydrodynamic pressure is built up in the lubricant within bearing gap 8, creating the load-bearing capacity of the bearing.

A hydrodynamic thrust bearing is formed at the lower end of shaft 4 by a thrust plate 9 connected to the shaft 4 and a cover plate 10. The hydrodynamic thrust bearing takes on the axial load of the bearing arrangement. Cover plate 10 forms a counter bearing to thrust plate 9 and seals the entire bearing arrangement from below so that no lubricant can escape from bearing gap 8. Both the thrust plate and the cover plate are accommodated in appropriate recesses in bearing sleeve 3.

The structure of the thrust bearing and particularly the attachment of the thrust plate to the shaft are now explained in more detail with reference to FIG. 1a.

According to the invention, thrust plate 9 can be arranged on shaft 4 in a sliding fit, a transition fit or by means of a press fit, i.e. the inner diameter of the central bore in thrust plate 9 can be slightly larger, the same size or smaller than the outer diameter of the shaft. Shaft 4 features axial bore 11 in the area where thrust plate 9 is to be positioned. The diameter of axial bore 11 preferably equals to at least half the thickness of the thrust plate. To mount thrust plate 9 onto shaft 4, a fixing element 12, preferably taking the shape of a sphere, is pressed into axial bore 11 of the shaft. An outer diameter of sphere 12 is larger than the inner diameter of the axial bore. Therefore, when the sphere is inserted into the axial bore, the shaft expands in this area and creates a radial fit which affixes the thrust plate to the shaft. The larger axial bore 11 in relation to the diameter of shaft 4 and the greater the excess size of sphere 12 compared to the diameter of the axial bore, the greater the expansion in shaft 4 caused by the insertion of sphere 12 and the greater the achievable press-out force. Before sphere 12 is pressed in, thrust plate 9 is set at a right angle to rotational axis 13 of shaft 4. A high-precision mounting device is used for this purpose.

According to the invention, sphere 12 performs another important function. During assembly, sphere 12 is only pressed into axial bore 11 to the extent that the surface of the sphere projects slightly from the end of shaft 4 by distance s and, at least when the spindle motor is at a standstill, rests on the surface of cover plate 10. Thus, when the motor is standing still or particularly during its start-up or shut-down phase, the bearing surface of thrust plate 9 does not rest on the bearing surface of cover plate 10. In this way, the wear and tear to the bearing surfaces and the moment of friction during start-up or shut-down of the motor is greatly reduced, since during start-up or shut-down only sphere 12 rests on the surface of cover plate 10.

As soon as the motor has achieved a sufficient speed, however, corresponding hydrodynamic pressure is built up in the bearing system that ensures that the motor runs almost without any friction at all. Distance s, to which sphere 12 projects from the end of shaft 4, is chosen in such a way that when the motor reaches its normal speed, sphere 12 lifts away from the surface of counter bearing 10 and no longer touches it.

In assembling the thrust bearing, axial bore 11 is first formed in the shaft in the area where thrust plate 9 is to be positioned. Thrust plate 9 is then slid onto or pressed into shaft 4 and set in the desired position at a precise right angle to rotational axis 13 of shaft 4. Finally, sphere 12 fixing thrust plate 9 is pressed into axial bore 11 in the shaft in such a way that the surface of the sphere projects from the end of shaft 4 by a distance s, wherein, at least when the spindle motor is at a standstill, the sphere rests on the surface of cover plate 10. At the same time, thrust plate 9 is firmly fixed to shaft 4 by the insertion of sphere 12 into axial bore 11 of the shaft.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing system, comprising:

a shaft having an axial bore;

a fixing element having at least partially spherical surface;

at least one radial bearing rotatably supporting said shaft;

at least one annular thrust plate fixedly mounted on said shaft; and a counter bearing corresponding to said thrust plate, wherein said axial bore is provided in an area of said thrust plate, and wherein said fixing element is pressed into said axial bore in such a way that said spherical surface of said fixing element projects slightly from an end of said shaft and rests on said counter bearing at least during a standstill phase.

2. The hydrodynamic bearing system according to claim 1, wherein said fixing element is a sphere.

3. The hydrodynamic bearing system according to claim 1, wherein said fixing element is a cylinder having a spherical surface at an end facing said counter bearing.

4. The hydrodynamic bearing system according to claim 1, wherein said fixing element projects from the end of said shaft by a defined distance, said distance being chosen in such a way that when a critical speed is reached, said fixing element lifts away from said counter bearing and no longer touches it.

5. The hydrodynamic bearing system according to claim 1, wherein said thrust plate is arranged in a sliding fit, a transition fit or by means of a press fit on said shaft.

6. The hydrodynamic bearing system according to claim 1, wherein an outer diameter of said fixing element is greater than an inner diameter of said axial bore, and wherein said thrust plate is fixed to said shaft by pressure generated when said fixing element is pressed into said shaft.

7. The hydrodynamic bearing system according to claim 1, wherein said thrust plate is arranged in a sliding fit, a transition fit or by means of a press fit on said shaft and is fixed to said shaft through the insertion of said fixing element into said axial bore.

* * * * *

UNITED STATES PATENT AND TRADEMARK OFFICE
CERTIFICATE OF CORRECTION

PATENT NO. : 6,984,069 B2
APPLICATION NO. : 10/620646
DATED : January 10, 2006
INVENTOR(S) : Joerg Hoffmann It is certified that error appears in the above-identified patent and that said Letters Patent is hereby corrected as shown below:

Title Page;
Section [75], Please insert; Thilo Rehm

Signed and Sealed this

Eighth Day of January, 2008

JON W. DUDAS
*Director of the United States Patent and Trademark Office*